No. 685,172. Patented Oct. 22, 1901.
P. C. QUACKENBUSH & C. F. CARLSON.
EGG POACHER.
(Application filed Dec. 11, 1900.)
(No Model.)
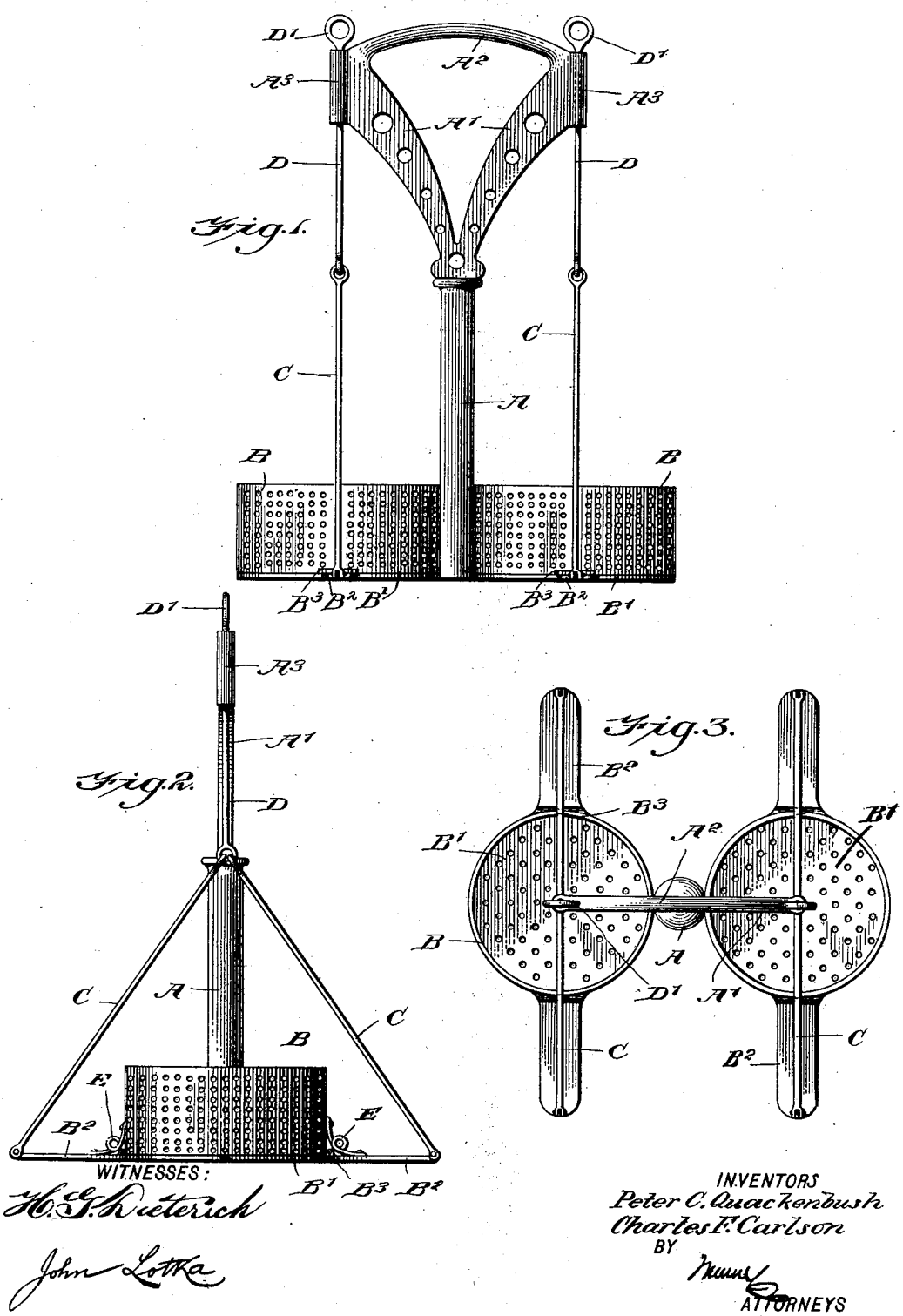
INVENTORS
Peter C. Quackenbush
Charles F. Carlson
BY
ATTORNEYS

UNITED STATES PATENT OFFICE.

PETER C. QUACKENBUSH AND CHARLES FREDERICK CARLSON, OF PATERSON, NEW JERSEY.

EGG-POACHER.

SPECIFICATION forming part of Letters Patent No. 685,172, dated October 22, 1901.

Application filed December 11, 1900. Serial No. 39,522. (No model.)

*To all whom it may concern:*

Be it known that we, PETER C. QUACKENBUSH and CHARLES FREDERICK CARLSON, citizens of the United States, and residents of Paterson, in the county of Passaic and State of New Jersey, have invented new and useful Improvements in Egg-Poachers, of which the following is a full, clear, and exact description.

Our invention relates to culinary utensils, and has particular reference to devices for poaching eggs.

The object of our invention is to provide an egg-poacher which will be simple in construction and which will enable the eggs when poached to be readily freed of the adhering water and to be placed upon a dish or plate without having to lift them out of the poacher with a spoon or similar implement.

The invention will be fully described hereinafter, and the features of novelty pointed out in the appended claims.

Reference is to be had to the accompanying drawings, forming a part of this specification, in which similar characters of reference indicate corresponding parts in all the figures.

Figure 1 is a front elevation of our improved egg-poacher. Fig. 2 is a side elevation thereof, and Fig. 3 is a plan.

The device comprises a central standard A, having at its upper end laterally-projecting arms A', connected by a cross-bar $A^2$, forming a handle. The arms A' are provided at their ends with sleeves or guides $A^3$, parallel with the standard A. At the bottom of the standard two cups B are secured thereto on opposite sides, these cups being perforated, as shown. Each cup is provided with a hinged bottom, preferably made of two sections B', hinged to the cup at points located at the ends of those diameters which form right angles with a line connecting the centers of the two cups. Arms $B^2$ extend outwardly from the hinges $B^3$, and the free ends of said arms are pivotally connected with links C, which converge upwardly and are pivotally connected with slides D, fitted to move in the guide-sleeves $A^3$. The particular arrangement of the hinges enables the two cups to be set close together, as the arms $B^2$ of the two cups are parallel and do not interfere with each other.

The bottoms are normally kept closed by springs E, secured to the outside of the cups B and to the arms or extensions $B^2$ of the bottom, and the sections B' of the bottom may be made to overlap, as shown in Fig. 2, so as to secure a flush joint. The bottom sections B', like the cups B, are perforated.

In using the device the implement is held by the handle $A^2$ and dipped into boiling water, the upper edges of the cups B being allowed to project above the surface of the water. The eggs are then broken into the cups. When the eggs are poached, the implement is withdrawn from the water, and as the cups B and bottom sections B' are perforated the water contained in the cups will run off. Then the utensil is held over the dish or plate on which it is desired to place the poached eggs, and the slides D are pulled upward by the handles D', provided at their upper ends. The bottom sections B' are thus caused to open, and one egg and then the other is allowed to slide or fall upon the underlying plate.

By the use of our improved egg-poacher handling of and possible injury to the eggs are avoided and the water is drained off. The device allows of quickly poaching eggs and preserves them entire.

While we have shown both the sides and the bottom of the cups perforated, it will be obvious that it will be sufficient to make either of them apertured, or they may even be made imperforate.

Having thus described our invention, we claim as new and desire to secure by Letters Patent—

1. An egg-poacher comprising a standard or frame, a cup secured to the frame, a movable bottom consisting of sections hinged to the cup at opposite sides thereof, and provided with outward extensions, a slide carried by the frame, and links each having one end secured to the slide and the other end to the extension of a bottom section.

2. An egg-poacher comprising a standard having at its upper end oppositely-arranged arms with parallel guides at their free ends, a handle connecting said arms, cups secured to the lower end of the standard at opposite sides thereof, movable bottoms for the cups, slides mounted to move on the parallel guides, and an operative connection between said slides and the movable bottoms.

3. An egg-poacher comprising a standard having at its upper end oppositely-arranged arms with parallel guides at their free ends, a handle connecting said arms, cups secured to the lower end of the standard at opposite sides thereof, movable bottoms for the cups, slides mounted to move on the parallel guides, and an operative connection between said slides and the movable bottoms, the cups and their bottoms being apertured.

In testimony whereof we have signed our names to this specification in the presence of two subscribing witnesses.

PETER C. QUACKENBUSH.
CHARLES FREDERICK CARLSON.

Witnesses:
ACKERMAN G. OATMAN,
HENRY A. ALLEN.